(12) United States Patent
Peters et al.

(10) Patent No.: US 9,631,074 B2
(45) Date of Patent: Apr. 25, 2017

(54) SULFUR-CROSSLINKABLE RUBBER BLEND AND VEHICLE PNEUMATIC TIRE

(71) Applicant: Continental Reifen Deutschland GmbH, Hannover (DE)

(72) Inventors: Fabian Peters, Hannover (DE); Thorsten Torbrügge, Langenhagen (DE); Carla Recker, Hannover (DE)

(73) Assignee: Continental Reifen Deutchland GmbH, Hannover (DE)

( * ) Notice: Subject to any disclaimer, the term of this patent is extended or adjusted under 35 U.S.C. 154(b) by 0 days.

(21) Appl. No.: 15/024,882

(22) Filed: Mar. 25, 2016

(65) Prior Publication Data

US 2016/0222197 A1 Aug. 4, 2016

Related U.S. Application Data

(63) Continuation of application No. PCT/EP2014/064880, filed on Jul. 11, 2014.

(30) Foreign Application Priority Data

Sep. 27, 2013 (DE) .................. 10 2013 110 719

(51) Int. Cl.
*C08L 9/00* (2006.01)
*B60C 1/00* (2006.01)
*C08L 9/06* (2006.01)
*B29B 7/74* (2006.01)

(52) U.S. Cl.
CPC ............. *C08L 9/00* (2013.01); *B29B 7/7495* (2013.01); *B60C 1/0016* (2013.04); *C08L 9/06* (2013.01); *C08L 2205/06* (2013.01)

(58) Field of Classification Search
CPC .................................. C08L 9/00; C08L 25/02
See application file for complete search history.

(56) References Cited

U.S. PATENT DOCUMENTS

| 5,534,599 | A | * | 7/1996 | Sandstrom | ............ B60C 1/0016 152/450 |
|---|---|---|---|---|---|
| 5,877,249 | A | | 3/1999 | Lambotte | |
| 8,450,424 | B2 | * | 5/2013 | Koelle | .................. B60C 1/0016 524/525 |
| 2010/0317800 | A1 | | 12/2010 | Pille-Wolf et al. | |
| 2011/0196100 | A1 | * | 8/2011 | Uchiyama | ............ B60C 1/0016 525/232 |
| 2012/0016056 | A1 | | 1/2012 | Miyazaki | |

FOREIGN PATENT DOCUMENTS

| EP | 1 063 246 A1 | 12/2000 |
|---|---|---|
| EP | 1 808 456 A1 | 7/2007 |
| EP | 2 412 731 A1 | 2/2012 |
| EP | 2 452 972 A1 | 5/2013 |
| JP | 2006052346 A | 2/2006 |
| JP | 2009001720 A | 1/2009 |
| JP | 2009215540 A | 9/2009 |
| JP | 2013032497 A | 2/2013 |

* cited by examiner

*Primary Examiner* — Vickey Nerangis

(57) ABSTRACT

A sulfur-crosslinkable rubber blend which includes from 60 to 100 phr of at least one butadiene rubber and 51 phr or more of at least one hydrocarbon resin which is built up to the extent of 30 to 100 wt. % from aromatic monomers. In some aspects the sulfur-crosslinkable rubber has from 51 to 300 phr of the at least one hydrocarbon resin which is built up to the extent of 30 to 100 wt. % from aromatic monomers, and in some cases, the hydrocarbon resin is built up to the extent of 30 to 100 wt. % from at least one aromatic monomer from the group consisting of alpha-methylstyrene and/or styrene and/or vinyltoluene and/or indene and/or coumarone and/or methylindene and/or methylcoumarone.

10 Claims, No Drawings

SULFUR-CROSSLINKABLE RUBBER BLEND AND VEHICLE PNEUMATIC TIRE

CROSS REFERENCE TO RELATED APPLICATIONS

This application is a continuation application of international patent application PCT/EP2014/064880, filed Jul. 11, 2014, designating the United States and claiming priority from German application 10 2013 110 719.2, filed Sep. 27, 2013, and the entire content of these applications is incorporated herein by reference.

FIELD OF THE INVENTION

The invention relates to a sulfur-crosslinkable rubber blend, in particular for treads of vehicle pneumatic tires, and a vehicle pneumatic tire.

BACKGROUND

Resins, in particular hydrocarbon resins, are additives which have been known for a long time for rubber blends for treads of vehicle pneumatic tires. They serve above all as processing auxiliaries and cause the necessary green tack of the rubber blends. Furthermore, certain vulkanisate properties, such as hardness, modulus and swelling properties, can be influenced by resins. They can also be employed as vulcanization resins or adhesion promoters. Typical bonding resins employed in the rubber industry are, for example petroleum resins, terpene resins, colophony resins, phenol-formaldehyde resins and coumarone-indene resins.

Resins from alpha-methylstyrene are known as additives for rubber blends. The use of resins based on alpha-methylstyrene in rubber blends is thus described e.g. in EP 2412731 A1, EP 1559586 A1 and DE 60201595 T2. These publications are concerned with the properties of the rubber blends disclosed therein with respect to at least one of the requirements in the tire, such as abrasion resistance, rolling resistance and wet grip, the rubber blends comprising up to 15 phr of the resin.

In the prior art limits are imposed on the use of relatively large amounts of resin due to the limited solubility in the polymer system of the particular rubber blend.

US/2012/0016056 A1 discloses, for example, a rubber blend for treads having silica as the main filler component, which comprises not more than 25 phr of a resin from alpha-methylstyrene and styrene. The resin here is premixed together with oil in order to improve the distribution of the resin in the polymer. This rubber blend is said to show an improvement with respect to rolling resistance properties, wet grip properties, abrasion resistance and handling properties.

WO 2012/062534 A1 and EP 0899297 describe, for example, rubber blends which can comprise up to 50 phr of a hydrocarbon resin. These rubber blends are said to solve the target conflict of rolling resistance and/or abrasion versus wet grip at a higher level, the rubber blends disclosed in the examples also here comprising only up to 15 phr of the particular hydrocarbon resin. In the examples disclosed all the blends comprise exclusively carbon black (70 phr) as a filler.

SUMMARY

This section provides a general summary of the disclosure, and is not a necessarily a comprehensive disclosure of its full scope or all of its features.

In a first embodiment of the disclosure, a sulfur-crosslinkable rubber blend is provided which includes from 60 to 100 phr of at least one butadiene rubber and 51 phr or more of at least one hydrocarbon resin which is built up to the extent of 30 to 100 wt. % from aromatic monomers. In some aspects the sulfur-crosslinkable rubber has from 51 to 300 phr of the at least one hydrocarbon resin which is built up to the extent of 30 to 100 wt. % from aromatic monomers, and in some cases, the hydrocarbon resin is built up to the extent of 30 to 100 wt. % from at least one aromatic monomer from the group consisting of alpha-methylstyrene and/or styrene and/or vinyltoluene and/or indene and/or coumarone and/or methylindene and/or methylcoumarone. In some cases, the hydrocarbon resin is built up to the extent of 51 to 100 wt. % from aromatic monomers. In some embodiments, the hydrocarbon resin is a copolymer from alpha-methylstyrene and styrene, which is built up to the extent of 100 wt. % from alpha-methylstyrene and styrene.

The hydrocarbon resin used in embodiments of the disclosure may have a softening point according to ASTM E 28 (ring and ball) of from 60 to 200° C. The hydrocarbon resin may have a molecular weight Mw (weight average) of from 500 to 5,000 g/mol and a centrifuge average Mc of from 500 to 10,000 g/mol. In some cases, the sulfur-crosslinkable rubber blend may include from 10 to 300 phr of at least one silica.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, or refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or an are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The invention is based on the object of providing a sulfur-crosslinkable rubber blend which, starting from the prior art, shows a further improvement in the target conflict of rolling resistance properties versus wet grip properties with simultaneously improved or at least the same tear properties.

The object is achieved according to the invention in that the sulfur-crosslinkable rubber blend comprises at least the following constituents:
60 to 100 phr of at least one butadiene rubber and,
51 phr or more of at least one hydrocarbon resin which is built up to the extent of 30 to 100 wt. % from aromatic monomers.

It is clear to the person skilled in the art that hydrocarbon resins are polymers which are built up from monomers, wherein the hydrocarbon resin is built up formally from derivatives of the monomers by linking of the monomers to one another.

For simplicity, in the context of the present invention the hydrocarbon resin which is built up to the extent of 30 to 100 wt. % (percent by weight based on the total weight of the hydrocarbon resin) from aromatic monomers is called hydrocarbon resin.

In preferred embodiments of the invention in which the hydrocarbon resin is built up to the extent of 51 to 100 wt. % from aromatic monomers, for simplicity this is called "predominantly aromatic hydrocarbon resin", since more than half the weight consists of aromatic constituents (monomers).

In the case of the hydrocarbon resins and the predominantly aromatic hydrocarbon resins, hydrocarbon resins which are copolymers from aromatic and non-aromatic (aliphatic) monomers are thus included in the rubber blend according to the invention.

In preferred embodiments of the invention in which the hydrocarbon resin is built up to the extent of 100 wt. % from aromatic monomers, for simplicity this is called "aromatic hydrocarbon resin".

Surprisingly, the rubber blend according to the invention lies at a higher performance level compared with the prior art with respect to the indicators for rolling resistance and wet grip. In particular, the rubber blend according to the invention surprisingly has a marked shift in the glass transition temperature, starting from the glass transition temperature of the butadiene rubber. This indicates a surprisingly good solubility of the comparatively high amounts of the hydrocarbon resin, preferably predominantly aromatic hydrocarbon resin, particularly preferably aromatic hydrocarbon resin, in the butadiene rubber.

The stated phr (parts per hundred parts of rubber by weight) used in this specification is in this context the conventional stated amount in the rubber industry for blend recipes. The dosage of the parts by weight of the individual substances in this context is always based on 100 parts by weight of the total weight of all the rubbers present in the blend.

The abovementioned hydrocarbon resins are not regarded as rubber in the context of this invention.

The rubber blend according to the invention comprises 60 to 100 phr, preferably 70 to 100 phr, particularly preferably 80 to 100 phr, of at least one butadiene rubber.

The butadiene rubber (=BR, polybutadiene) can be all the types known to the person skilled in the art. These include, inter alia, the so-called high-cis and low-cis types, polybutadiene having a cis content of greater than or equal to 90 wt. % being called a high-cis type and polybutadiene having a cis content of less than 90 wt. % being called a low-cis type. A low-cis polybutadiene is e.g. Li-BR (lithium-catalyzed butadiene rubber) having a cis content of from 20 to 50 wt. %. Particularly good abrasion properties of the rubber blend are achieved with a high-cis BR.

The polybutadiene employed can be modified with end groups with the modifications and functionalizations mentioned below.

The rubber blend according to the invention comprises 51 phr or more, preferably 51 to 300 phr, particularly preferably 51 to 150 phr, very particularly preferably 51 to 100 phr, very particularly preferably again 51 to phr, of at least one hydrocarbon resin which is built up to the extent of 30 to 100 wt. % (percent by weight, based on the total weight of the hydrocarbon resin) from aromatic monomers. Preferably, the hydrocarbon resin is built up to the extent of 51 to 100 wt. %, that is to say predominantly, from aromatic monomers. Particularly preferably, the predominantly aromatic hydrocarbon resin is built to the extent of 60 to 100 wt. %, particularly preferably to the extent of 70 to 100 wt. %, very particularly preferably to the extent of 80 to 100 wt. %, very particularly preferably again to the extent of 90 to 100 wt. %, from aromatic monomers.

According to a preferred embodiment of the invention the hydrocarbon resin is built up to the extent of 100 wt. % from aromatic monomers and is therefore an aromatic hydrocarbon resin. With this, a particularly good improvement in the rubber blend with respect to the target conflict of rolling resistance and wet grip and an improvement in the winter properties result, a storage modulus E' in the temperature range from about −28 to −32° C. which is as low as possible having a positive effect on the winter properties, in particular the braking properties.

The hydrocarbon resin is preferably built up from at least one aromatic monomer from the group comprising alpha-methylstyrene and/or styrene and/or vinyltoluene and/or indene and/or coumarone and/or methylindene and/or methylcoumarone.

The hydrocarbon resin is particularly preferably built up from at least one aromatic monomer from the group consisting of alpha-methylstyrene and/or styrene and/or vinyltoluene and/or indene and/or coumarone and/or methylindene and/or methylcoumarone.

The hydrocarbon resin can therefore be a homopolymer and/or a copolymer. In the present application homopolymer is understood as meaning a polymer which, according to Römpp Online version 3.28, "is formed from monomers of only one type". In the context of the present invention copolymer is understood as meaning a polymer which is built up from several, i.e. two or more, different monomers. In the context of the present invention the hydrocarbon resin can therefore e.g. also be a copolymer from three different monomers.

The vinyltoluene (also ar-methylstyrene) can be p-vinyltoluene and/or m-vinyltoluene and/or o-vinyltoluene.

According to the embodiments in which the hydrocarbon resin is built up to the extent of less than 100 wt. %, that is to say 30 to 99.9999 wt. %, from aromatic monomers, the hydrocarbon resin comprises non-aromatic, that is to say aliphatic, monomers. The aliphatic monomers can be monomers of the C5 crude oil fraction, e.g. isoprene, and/or monomers of the terpenes and/or cycloolefins and/or olefins, such as pentene, for example. C5 is to be understood as meaning that these monomers are built up from five carbon atoms.

Furthermore, the C5 crude oil fraction can comprise monomers (units) having four, that is to say C4 monomers, or six carbon atoms, C6 monomers.

According to Römpp Online Lexikon, version 3.36 "aliphatic compounds" is a "collective name [ . . . ] for functionalized or non-functionalized organic compounds which comprise no aromatic ring system."

Particularly preferably, the hydrocarbon resin is built up at least from alpha-methylstyrene and styrene and is therefore a copolymer from alpha-methylstyrene and styrene, it being built up to the extent of 30 to 100 wt. %, preferably 51 to 100 wt. %, from alpha-methylstyrene and styrene. It is conceivable here, for example, that aliphatic monomers are present to the extent of 0 to 70 wt. %, preferably 0 to 49 wt. %, for example 5 wt. %, as a result of which, starting from 100 wt. %, the content of aromatic monomers is reduced accordingly.

Very particularly preferably, the aromatic hydrocarbon resin is built up from alpha-methylstyrene and styrene and is therefore a copolymer from alpha-methylstyrene and styrene, it being built up to the extent of 100 wt. % from alpha-methylstyrene and styrene. With this, a particularly good improvement in the rubber blend with respect to the target conflict of rolling resistance and wet grip and an improvement in the winter properties result.

The hydrocarbon resin contained in the rubber blend according to the invention has a softening point according to ASTM E 28 (ring and ball) of from 60 to 200° C., preferably 60 to 150° C., particularly preferably 60 to 120° C., very particularly preferably 60 to 100° C., and very particularly preferably again 80 to 90° C. Such a hydrocarbon resin is obtainable e.g. under the trade name SYLVATRAXX® 4401 from Arizona Chemical Company.

By this means, in particular if high amounts of the hydrocarbon resin of 51 phr or more, preferably 51 to 300 phr, particularly preferably 51 to 150 phr, very particularly preferably 51 to 100 phr, very particularly preferably again 51 to 85 phr, are used, particularly good properties of the rubber blend with respect to the requirements of rolling resistance and wet grip are achieved, which could be explained inter alia by a surprisingly good solubility of the hydrocarbon resin in the butadiene rubber.

Furthermore, the hydrocarbon resin contained in the rubber blend according to the invention preferably has a molecular weight Mw (weight average) of from 500 to 5,000 g/mol, particularly preferably 500 to 3,000 g/mol, very particularly preferably 500 to 2,500 g/mol, particularly preferably again 800 to 2,500 g/mol, very particularly preferably again 800 to 2,000 g/mol. Such a hydrocarbon resin having a molecular weight Mw of 1,300 g/mol is obtainable e.g. under the trade name SYLVATRAXX® 4401 from Arizona Chemical Company.

Furthermore, the hydrocarbon resin contained in the rubber blend according to the invention preferably has a molecular weight Mc (centrifuge average) of from 500 to 10,000 g/mol, particularly preferably 1,000 to 10,000 g/mol, very particularly preferably 1,000 to 7,000 g/mol, particularly preferably again 1,500 to 5,000 g/mol, very particularly preferably again 1,500 to 3,000 g/mol, very particularly preferably again 1,700 to 2,300 g/mol. Such a hydrocarbon resin having a centrifuge average Mc of 2,018 g/mol is obtainable e.g. under the trade name SYLVATRAXX® 4401 from Arizona Chemical Company. By this means, in particular if high amounts of the hydrocarbon resin of 51 phr or more, preferably 51 to 300 phr, particularly preferably 51 to 150 phr, very particularly preferably 51 to 100 phr, very particularly preferably again 51 to 85 phr, are used, particularly good properties of the rubber blend with respect to the requirements of rolling resistance and wet grip are achieved, which could be explained inter alia by a surprisingly good solubility of the hydrocarbon resin in the butadiene rubber.

The determination of the molecular weight (weight average Mw and centrifuge average Mc) is carried out by means of gel permeation chromatography in accordance with DIN 55672-1 (GPC with tetrahydrofuran as the eluting agent, polystyrene standard; SEC=size exclusion chromatography).

As stated above, the rubber blend according to the invention comprises 60 to 100 phr of at least one butadiene rubber. The rubber blend according to the invention thus comprises, if it comprises less than 100 phr of butadiene rubber, at least one further rubber in amounts of from 0 to 40 phr, preferably 0 to 30 phr, particularly preferably 0 to 20 phr, but at least 0.1 phr.

The at least one further rubber here is selected from the group consisting of natural polyisoprene and/or synthetic polyisoprene and/or solution-polymerized styrene/butadiene rubber and/or emulsion-polymerized styrene/butadiene rubber and/or liquid rubbers having a molecular weight Mw of greater than 20,000 g/mol and/or halobutyl rubber and/or polynorbornene and/or isoprene/isobutylene copolymer and/or ethylene/propylene/diene rubber and/or nitrile rubber and/or chloroprene rubber and/or acrylate rubber and/or fluororubber and/or silicone rubber and/or polysulfide rubber and/or epichlorohydrin rubber and/or styrene/isoprene/butadiene terpolymer and/or hydrogenated acrylonitrile/butadiene rubber and/or isoprene/butadiene copolymer and/or hydrogenated styrene/butadiene rubber, wherein the rubbers can be modified. The modification can be one with hydroxyl groups and/or ethoxy groups and/or epoxide groups and/or siloxane groups and/or amino groups and/or aminosiloxane and/or carboxyl groups and/or phthalocyanine groups and/or silane sulfide groups. However, further modifications known to the person skilled in the art, also called functionalizations, are also possible. Metal atoms can be a constituent of such functionalizations.

These modifications and functionalizations also apply to the abovementioned butadiene rubber (polybutadiene) contained according to the invention in the rubber blend.

In particular, nitrile rubber, hydrogenated acrylonitrile/butadiene rubber, chloroprene rubber, butyl rubber, halobutyl rubber or ethylene/propylene/diene rubber are employed in the production of industrial rubber articles, such as belts, straps and hoses.

Particularly preferably, the further rubber is a diene rubber and is selected from the group consisting of synthetic polyisoprene and natural polyisoprene and styrene/butadiene rubber. Preferably, the further diene rubber is natural polyisoprene. With this, a particularly good processability (extrudability, miscibility etc.) of the rubber blend according to the invention is achieved.

The rubber blend according to the invention furthermore comprises, in particular for the use in vehicle pneumatic tires, preferably 10 to 300 phr, preferably 30 to 300 phr, particularly preferably 30 to 150 phr, of at least one filler. These can be all the fillers known to the person skilled in the art, such as silica, alumosilicates, carbon black, carbon nanotubes, chalk, starch, magnesium oxide, titanium dioxide or rubber gels.

Preferably, the rubber blend comprises at least one silica and/or at least one carbon black as a filler.

In this context, all the carbon black types known to the person skilled in the art are conceivable. Preferably, however, a carbon black which has an iodine adsorption number according to ASTM D 1510 of from 30 to 180 g/kg, preferably 40 to 180 g/kg, particularly preferably 40 to 130 kg/g, and a DBP number according to ASTM D 2414 of from 80 to 200 ml/100 g, preferably 100 to 200 ml/100 g, particularly preferably 100 to 180 ml/100 g, is employed.

With this, rolling resistance indicators (rebound resilience at 70° C.) and abrasion and/or tear properties which are particularly good for use in vehicle tires are achieved.

The silicas can be the silicas which are known to the person skilled in the art and are suitable as a filler for tire rubber blends. It is particularly preferable, however, for a finely divided, precipitated silica which has a nitrogen surface area (BET surface area) (according to DIN ISO 9277 and DIN 66132) of from 35 to 350 $m^2/g$, preferably from 35 to 260 $m^2/g$, particularly preferably from 100 to 260 $m^2/g$ and very particularly preferably from 115 to 235 $m^2/g$, and a CTAB surface area (according to ASTM D 3765) of from 30 to 400 $m^2/g$, preferably from 30 to 250 $m^2/g$, particularly preferably from 100 to 250 $m^2/g$ and very particularly preferably from 110 to 230 $m^2/g$, to be used. Such silicas lead e.g. in rubber blends for tire treads to particularly good physical properties of the vulcanisates. Moreover, in this context advantages may result in the processing of the blend by a reduction in the mixing time with constant product properties, leading to an improved productivity. Silicas which can be employed are thus e.g. both those of the Ultrasil® VN3 (trade name) type from Evonik and highly dispersible silicas, so-called HD silicas (e.g. Zeosil® 1165 MP from Rhodia).

To improve the processability and to bind the silica and other polar fillers which may be present to the diene rubber, silane coupling agents can be employed in rubber blends. One or several different silane coupling agents in combination with one another can be employed here. The rubber blend can thus comprise a mixture of different silanes.

The silane coupling agents react with the silanol groups on the surface of the silica or other polar group during mixing of the rubber or the rubber blend (in situ) or even before the addition of the filler to the rubber in the sense of a pretreatment (premodification). Silane coupling agents which can be used in this context are all the silane coupling agents known to the person skilled in the art for use in rubber blends. Such coupling agents known from the prior art are bifunctional organosilanes which have at least one alkoxy, cycloalkoxy or phenoxy group as a leaving group on the silicon atom and which have a group as another functionality which can optionally undergo a chemical reaction with the double bonds of the polymer after cleavage. The latter group can be e.g. the following chemical groups:

—SCN, —SH, —NH$_2$ or —S$_x$— (where x=2 to 8).

Silane coupling agents which can be used are thus e.g. 3-mercaptopropyltriethoxysilane, 3-thiocyanatopropyltrimethoxysilane or 3,3'-bis(triethoxysilylpropyl)polysulfides having 2 to 8 sulfur atoms, such as e.g. 3,3'-bis (triethoxysilylpropyl)tetrasulfide (TESPT), the corresponding disulfide (TESPD) or also mixtures of the sulfides having 1 to 8 sulfur atoms with different contents of the various sulfides. TESPT can also be added in this context, for example, as a mixture with industrial carbon black (trade name X50S® from Evonik). Preferably, a silane mixture which comprises disulfides to the extent of 40 to 100 wt. %, particularly preferably 55 to 85 wt. % of disulfides and very particularly preferably 60 to 80 wt. % of disulfides, is employed. Such a mixture is obtainable e.g. under the trade name Si 261® from Evonik, which is described e.g. in DE 102006004062 A1.

Blocked mercaptosilanes such as are known e.g. from WO 99/09036 can also be employed as the silane coupling agent. Silanes such as are described in WO 2008/083241 A1, WO 2008/083242 A1, WO 2008/083243 A1 and WO 2008/083244 A1 can also be employed. Silanes e.g. which are marketed under the name NXT in various variants by Momentive, USA or those which are marketed under the name VP Si 363® by Evonik Industries can be used.

According to a preferred embodiment of the invention silica is present as the sole or main filler, that is to say the amount of silica is significantly greater than the amount of other fillers which may be present. With silica as the sole filler or main filler particularly good rolling resistance indicators are achieved in the rubber blend according to the invention, in particular for use in the tread of vehicle pneumatic tires, the other tire properties, such as wet braking and/or abrasion properties and/or handling properties and/or the tear properties being at a good level or even improved. The amount of silica here is 10 to 300 phr, preferably 50 to 250 phr, particularly preferably 50 to 180 phr, very particularly preferably 50 to 150 phr, very particularly preferably again 50 to 130 phr. It is conceivable here that the rubber blend moreover comprises 0.1 to 30 phr, preferably 2 to 30 phr, particularly preferably 2 to 10 phr of at least one carbon black.

According to a preferred embodiment of the invention the rubber blend comprises 50 to 70 phr of at least one silica. According to a further preferred embodiment of the invention the rubber blend comprises 105 to 135 phr of at least one silica.

According to a further preferred embodiment of the invention carbon black is present as the sole filler or as the main filler, that is to say the amount of carbon black is significantly greater than the amount of other fillers which may be present. With carbon black as the sole filler or main filler a particularly good abrasion resistance is achieved in the rubber blend according to the invention, in particular for use in the tread of vehicle pneumatic tires, the other tire properties, such as wet braking and/or rolling resistance properties and/or handling properties and/or the tear properties being at a good level or even improved. The amount of carbon black here is 10 to 300 phr, preferably 50 to 250 phr, particularly preferably 50 to 180 phr, very particularly preferably 50 to 150 phr, very particularly preferably again 50 to 130 phr. In the case where a further filler is present in addition to carbon black, this is preferably silica. It is thus also conceivable that the rubber blend according to the invention comprises carbon black and silica in similar amounts, such as e.g. 20 to 100 phr of carbon black in combination with 20 to 100 phr of silica.

However, it is also conceivable that the rubber blend moreover comprises, in addition to carbon black as the main filler, 0.1 to 30 phr, preferably 2 to 30 phr, particularly preferably 2 to 10 phr of at least one silica.

0 to 70 phr, preferably 0.1 to 60 phr, preferably 0.1 to 50 phr, of at least one plasticizer can also be present in the rubber blend. These include all the plasticizers known to the person skilled in the art, such as aromatic, naphthenic or paraffinic mineral oil plasticizers, such as e.g. MES (mild extraction solvate) or TDAE (treated distillate aromatic extract) or naphthenic process oils by hydrogenation as described, for example, in EP 2357219 A1, or rubber-to-liquid oils (RTL) or biomass-to-liquid oils (BTL) or factices or plasticizer resins or liquid polymer (such as liquid BR), the average molecular weight Mw of which (determination by GPC=gel permeation chromatography in accordance with BS ISO 11344:2004) is between 500 and 20,000 g/mol. If liquid polymers are employed as plasticizers in the rubber blend according to the invention, these are not included as rubber in the calculation of the composition of the polymer matrix.

If mineral oil is used, this is preferably selected from the group consisting of DAE (distillate aromatic extracts) and/or RAE (residual aromatic extract) and/or TDAE (treated distillate aromatic extracts) and/or MES (mild extracted solvents) and/or naphthenic oils.

Furthermore, the rubber blend according to the invention can comprise conventional additives in conventional parts by weight. These additives include:
a) antiageing agents, such as e.g.
N-phenyl-N'-(1,3-dimethylbutyl)-p-phenylenediamine (6PPD),
N,N'-diphenyl-p-phenylenediamine (DPPD),
N,N'-ditolyl-p-phenylenediamine (DTPD),
N-isopropyl-N'-phenyl-p-phenylenediamine (IPPD),
2,2,4-trimethyl-1,2-dihydroquinoline (TMQ),
b) activators, such as e.g. zinc oxide and fatty acids (e.g. stearic acid),
c) waxes,
d) further resins, in particular bonding resins which do not fall under the abovementioned aromatic hydrocarbon resins,
e) mastication auxiliaries, such as e.g. 2,2'-dibenzamidodiphenyl disulfide (DBD), and
f) processing auxiliaries, such as e.g. fatty acid salts, such as e.g. zinc soaps, and fatty acid esters and derivatives thereof.

In particular in the use of the rubber blend according to the invention for the internal components of a tire or of an industrial rubber article which have direct contact to the reinforcing supports present, a suitable adhesive system, often in the form of bonding resins, is as a rule also added to the rubber blend.

The amount content of the total amount of further additives is 3 to 150 phr, preferably 3 to 100 phr and particularly preferably 5 to 80 phr.

The total amount of the further additives also includes 0.1 to 10 phr, preferably 0.2 to 8 phr, particularly preferably 0.2 to 4 phr, of zinc oxide (ZnO).

This can be all types of zinc oxide known to the person skilled in the art, such as e.g. ZnO granules or powder. The zinc oxide conventionally used has as a rule a BET surface area of less than 10 m$^2$/g. However, so-called nano-zinc oxide having a BET surface area of from 10 to 60 m$^2$/g can also be used.

The vulcanization is carried out in the presence of sulfur or sulfur donors with the aid of vulcanization accelerators, it being possible for some vulcanization accelerators to act as sulfur donors at the same time. Sulfur or sulfur donors and one or more accelerators are added to the rubber blend in the amounts mentioned during the last mixing step. In this context the accelerator is selected from the group consisting of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators. The use of a sulfenamide accelerator selected from the group consisting of N-cyclohexyl-2-benzothiazolesulfenamide (CBS) and/or N,N-dicyclohexylbenzothiazole-2-sulfenamide (DCBS) and/or benzothiazyl-2-sulfenemorpholide (MBS) and/or N-tert-butyl-2-benzothiazylsulfenamide (TBBS) is preferred.

In a preferred embodiment of the invention the rubber blend comprises CBS as an accelerator. Particularly good tear properties of the rubber blend are achieved by this means.

Further network-forming systems such as are obtainable, for example, under the trade names Vulkuren®, Duralink® or Perkalink®, or network-forming systems such as are described in WO 2010/049261 A2 can be employed in the rubber blend. This system comprises a vulcanizing agent which crosslinks with a functionality of greater than four and at least one vulcanization accelerator. The vulcanizing agent which crosslinks with a functionality of greater than four has, for example, the general formula A):

$$G[C_aH_{2a}-CH_2-S_bY]_c \qquad A)$$

wherein G is a polyvalent cyclic hydrocarbon group and/or a polyvalent heterohydrocarbon group and/or a polyvalent siloxane group which comprises 1 to 100 atoms; wherein each Y independently selected from a rubber-active group comprises sulfur-containing functionalities; and wherein a, b and c are integers for which, independently: a is 0 to 6; b is 0 to 8; and c is 3 to 5.

The rubber-active group is preferably selected from a thiosulfonate group, a dithiocarbamate group, a thiocarbonyl group, a mercapto group, a hydrocarbon group and a sodium thiosulfonate group (colored salt group).

Very good abrasion and tear properties of the rubber blend according to the invention are achieved with these.

Moreover, vulcanization retardants can be present in the rubber blend.

A further object of the present invention is to provide a vehicle pneumatic tire which, starting from the prior art, is distinguished by a further improvement in the target conflict of rolling resistance properties versus wet grip properties. This object is achieved in that the vehicle pneumatic tire comprises the rubber blend according to the invention as described above in at least one component. In this context all the statements given above for the constituents and features thereof apply.

Preferably, the component is a tread. As is known to the person skilled in the art, the tread contributes to the overall rolling resistance of the tire to a relatively high proportion. Furthermore, the safety of the vehicle pneumatic tire during driving depends substantially on the wet grip properties, in particular the wet braking properties, of the tread.

However, it is also moreover conceivable that the vehicle pneumatic tire comprises the rubber blend in at least one other outer and/or internal component, a so-called body component, such as the side wall, inner liner (inner layer), squeegee, core profile, belt, shoulder, belt profile, carcass, heel reinforcer, heel profile, horn profile and binding.

The preparation of the rubber blend according to the invention is carried out by the conventional process in the rubber industry, in which a base blend having all the constituents apart from the vulcanization system (sulfur and vulcanization-influencing substances) is first prepared in one or more mixing steps. The finished blend is produced by addition of the vulcanization system in a last mixing step. The finished blend is further processed e.g. by an extrusion operation and brought into the appropriate form.

For use in vehicle pneumatic tires the blend is preferably brought into the form of a tread and applied as is known during the production of the vehicle tire blank. However, the tread can also be wound in the form of a narrow strip of rubber blend on to a tire blank. In the case of treads divided into two (upper part: cap and lower part: base) the rubber blend according to the invention can be used both for the cap and for the base. The preparation of the rubber blend according to the invention for use as a body blend in vehicle pneumatic tires is carried out as already described for the tread. The difference lies in the shaping after the extrusion operation. The forms obtained in this way from the rubber blend for one or more different body blends then serve for building up a tire blank.

The invention is now to be explained in more detail with the aid of comparative and embodiment examples, which are summarized in Table 1.

Dynamic storage modulus E' at −30.5 to −29.8° C. from temperature-dependent measurement ("temperature sweep") in accordance with DIN 53513

Abrasion at room temperature in accordance with DIN 53 516 or DIN/ISO 4649

Glass transition temperature $T_g$ of the rubber blend by means of DSC in accordance with ISO 11357-1 and 11357-21987 p. 519-527 (calibrated DSC with low temperature device, calibration according to apparatus type and manufacturer's instructions, sample in an aluminum crucible with an aluminum lid)

Substance used:
a) BR: Butadiene rubber, high-cis BR
b) Silica: VN3, Evonik
c) Aromatic hydrocarbon resin: SYLVATRAXX® 4401 from Arizona Chemical Company, built up from alpha-methylstyrene and styrene; Mw=1,300 g/mol, Mc=2,018 g/mol; SP=80 to 90° C.
d) $C_5$ resin: Escorez™ 1102, Exxon Mobil Chemical, Mw=4,500 g/mol Mc=15,000 g/mol, SP=100° C.
e) 6PPD+antiozonant wax
f) Silane: TESPD
g) DPG and CBS

TABLE 1

| | Unit | C1 | C2 | C3 | E1 | E2 | C4 | C5 | C6 | C7 |
|---|---|---|---|---|---|---|---|---|---|---|
| Constituents | | | | | | | | | | |
| BR[a)] | phr | 100 | 100 | 100 | 100 | 100 | 100 | 100 | 100 | 100 |
| Silica[b)] | phr | 60 | 60 | 60 | 60 | 60 | 60 | 60 | 60 | 60 |
| HC resin[c)] | phr | — | 20 | 40 | 60 | 80 | — | — | — | — |
| $C_5$ resin[d)] | phr | — | — | — | — | — | 20 | 40 | 60 | 80 |
| Antiageing agent[e)] | phr | 4 | 4 | 4 | 4 | 4 | 4 | 4 | 4 | 4 |
| Stearic acid | phr | 2.5 | 2.5 | 2.5 | 2.5 | 2.5 | 2.5 | 2.5 | 2.5 | 2.5 |
| ZnO | phr | 2.5 | 2.5 | 2.5 | 2.5 | 2.5 | 2.5 | 2.5 | 2.5 | 2.5 |
| Silane[f)] | phr | 4.3 | 4.3 | 4.3 | 4.3 | 4.3 | 4.3 | 4.3 | 4.3 | 4.3 |
| Accelerator[g)] | phr | 4 | 4 | 4 | 4 | 4 | 4 | 4 | 4 | 4 |
| Sulfur | phr | 2 | 2 | 2 | 2 | 2 | 2 | 2 | 2 | 2 |
| Properties | | | | | | | | | | |
| Rebound at RT | % | 53 | 56 | 52 | 46 | 40 | 56 | 52 | 47 | 43 |
| Rebound at 70° C. | % | 56 | 61 | 61 | 59 | 60 | 62 | 60 | 54 | 49 |
| Diff. rebound (70° C.-RT) | | 3 | 5 | 9 | 13 | 20 | 6 | 8 | 7 | 6 |
| Tensile strength | MPa | 7 | 9 | 14 | 14 | 12 | 7 | 9 | 11 | 10 |
| Elongation at break | % | 239 | 388 | 675 | 813 | 834 | 324 | 492 | 704 | 737 |
| DIN abrasion | mm$^3$ | 25 | 39 | 44 | 67 | 112 | 36 | 64 | 110 | 156 |
| E' | MPa | 267 | 239 | 62 | 52 | 61 | 335 | 433 | 542 | 679 |
| $T_g$ | ° C. | −104 | −99 | −95 | −91 | −88 | −102 | −101 | −100 | −99 |

The comparison blends are identified with C, the blends according to the invention are identified with E.

The preparation of the blend was carried out under conventional conditions in three steps in a laboratory tangential mixer. Test specimens were produced from all the blends by optimum vulcanization under pressure at 160° C., and with these test specimens material properties typical for the rubber industry were determined using the test methods stated in the following.

Rebound resilience at RT and 70° C. in accordance with DIN 53 512

Tensile strength and elongation at break at room temperature in accordance with DIN 53 504

As can be seen from Table 1, the use of comparatively large amounts, compared with the prior art (C2 and C3), of hydrocarbon resin comprising aromatic monomers (E1 and E2) surprisingly leads to a significant improvement in the wet grip and rolling resistance indicators. The lower the value for the rebound resilience at room temperature, the better the wet grip properties. The higher the rebound resilience at 70° C., the better the rolling resistance properties of the rubber blend. Rubber blends E1 and E2 according to the invention therefore lie at a higher level with respect to the target conflict of rolling resistance and wet grip, which becomes clear in particular from the increased differences in the rebound resiliences (rebound resilience at 70° C. minus rebound resilience at RT). As can be seen from comparative examples C4 to C7, this improvement is not achieved with a $C_5$ resin which comprises no aromatic monomers. An increase in the resin content to very high amounts here leads to a deterioration in the target conflict of rolling resistance versus wet grip, which emerges from the decreasing difference in the rebound resiliences of comparative blends C5 to C7. Furthermore, comparison of rubber blends E1 and E2 according to the invention with C6 and C7, that is to say the comparative examples having in each case the same amount of resin, shows that the abrasion properties are significantly better with the aromatic hydrocarbon resin. Surprisingly, the aromatic hydrocarbon resin, in contrast to the $C_5$ resin, also still appears to dissolve in the butadiene rubber in the very high amounts of 60 and 80 phr, which can be seen from the comparatively large shift in the glass transition temperature $T_g$ of the rubber blend.

Furthermore, rubber blends E1 and E2 according to the invention have better winter properties compared with the comparative examples, which can be seen from the lower values for the storage modulus E' in the range between −30.5 and −29.8° C.

The foregoing description of the embodiments has been provided for purposes of illustration and description. Example embodiments are provided so that this disclosure will be sufficiently thorough, and will convey the scope to those who are skilled in the art. Numerous specific details are set forth such as examples to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

The invention claimed is:

1. A sulfur-crosslinkable rubber blend comprising:
   from 60 to 100 phr of at least one butadiene rubber; and,
   51 phr or more of at least one hydrocarbon resin which is built up to the extent of 30 to 100 wt. % from at least two aromatic monomers, wherein the at least one hydrocarbon resin has a molecular weight Mw (weight average) of from 1300 to 5,000 g/mol and a softening point according to ASTM E 28 (ring and ball) of from 60 to 95° C.

2. The sulfur-crosslinkable rubber blend of claim 1 comprising 51 to 300 phr of the at least one hydrocarbon resin which is built up to the extent of 30 to 100 wt. % from aromatic monomers.

3. The sulfur-crosslinkable rubber blend of claim 1 wherein the hydrocarbon resin is built up to the extent of 30 to 100 wt. % from aromatic monomers selected from the group consisting of alpha-methylstyrene and/or styrene and/or vinyltoluene and/or indene and/or coumarone and/or methylindene and/or methylcoumarone.

4. The sulfur-crosslinkable rubber of claim 1 wherein the hydrocarbon resin is built up to the extent of 51 to 100 wt. % from aromatic monomers.

5. The sulfur-crosslinkable rubber blend of claim 1 wherein the hydrocarbon resin is a copolymer from alpha-methylstyrene and styrene, which is built up to the extent of 100 wt. % from alpha-methylstyrene and styrene.

6. The sulfur-crosslinkable rubber blend of claim 1 wherein the hydrocarbon resin has a softening point according to ASTM E 28 (ring and ball) of from 80 to 90° C.

7. The sulfur-crosslinkable rubber blend of claim 1 wherein the hydrocarbon resin has a molecular weight Mw (weight average) of from 1300 to 2,500 g/mol.

8. The sulfur-crosslinkable rubber blend of claim 1 further comprising from 10 to 300 phr of at least one silica.

9. A vehicle pneumatic tire comprising the sulfur-crosslinkable rubber blend of claim 1.

10. The vehicle pneumatic tire as claimed in claim 9, wherein the sulfur-crosslinkable rubber blend is comprised in a tread of the vehicle pneumatic tire.

* * * * *